United States Patent

[11] 3,620,313

| [72] | Inventors | Lester C. Elmore<br>Portola Valley;<br>Thomas M. Broxholm, Palo Alto, both of Calif. |
|---|---|---|
| [21] | Appl. No. | 869,660 |
| [22] | Filed | Oct. 27, 1969 |
| [45] | Patented | Nov. 16, 1971 |
| [73] | Assignee | Pulsepower Systems Incorporated |

[54] PULSED HIGH-PRESSURE LIQUID PROPELLANT COMBUSTION-POWERED LIQUID JET DRILLS
21 Claims, 5 Drawing Figs.

[52] U.S. Cl. .................................................. 175/14,
175/67, 175/93
[51] Int. Cl. ....................................................... E21b 7/18
[50] Field of Search............................................175/4, 4.51,
14, 65, 67, 73, 92, 93, 100, 102, 324, 422;
417/364; 123/1 A; 299/16, 17

[56] References Cited
UNITED STATES PATENTS

| 3,489,230 | 1/1970 | Nelson | 175/93 |
| 1,408,720 | 3/1922 | Breton et al. | 175/93 |
| 2,564,052 | 8/1951 | Chiville | 417/364 X |
| 2,648,317 | 8/1953 | Mikulasek et al. | 123/1 A |
| 2,776,816 | 1/1957 | Jackson | 175/93 X |
| 2,838,034 | 6/1958 | Clark | 123/1 A X |
| 3,112,800 | 12/1963 | Bobo | 75/422 X |
| 3,141,512 | 7/1964 | Gaskell et al. | 175/73 X |
| 3,174,432 | 3/1965 | Eickmann | 417/364 X |
| 3,280,923 | 10/1966 | Muench | 175/93 X |

FOREIGN PATENTS

| 122,107 | 5/1964 | U.S.S.R. | 175/4.5 |

OTHER REFERENCES

Maurer, Wm. C., Novel Drilling Techniques N.Y., Pergamon Press, Mar. 1968 pp. 3– 44 (Copy in 175– 67)

*Primary Examiner*—Ian A. Calvert
*Attorney*—Fryer, Tjensvold, Feix, Phillips & Lempio

ABSTRACT: A liquid propellant is burned in the bulk mode and in pulses to produce high combustion pressures with large power outputs. The pulsed high-pressure liquid propellant combustion is used in combination with a liquid jet drill to eject high-velocity and high-pressure jets of liquid from liquid jet nozzles in the drill for erosion drilling. The high combustion pressures produced by burning the liquid propellant in the bulk mode and in pulses may be used to overcome highback pressures such as those existing at deep drilling depths and in deep ocean depths.

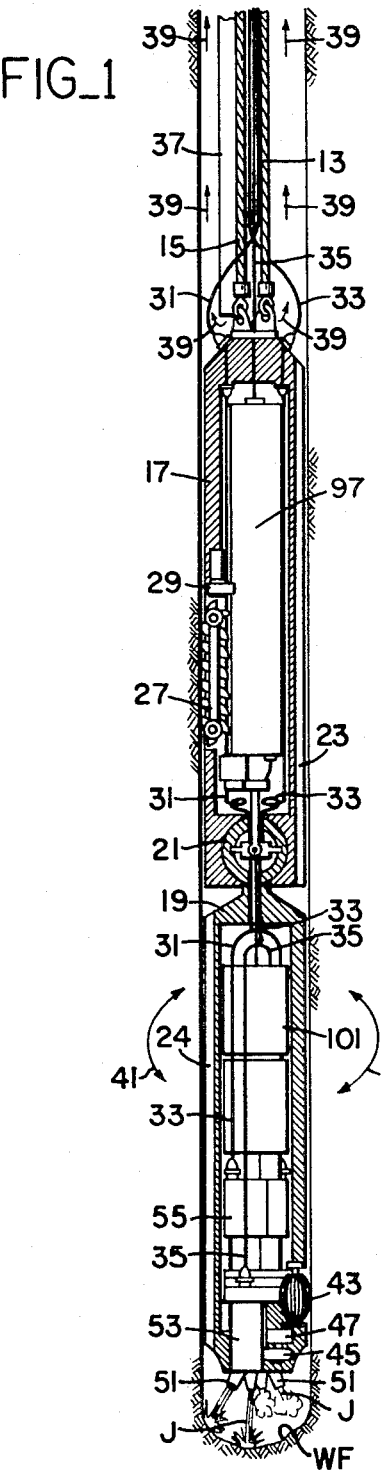
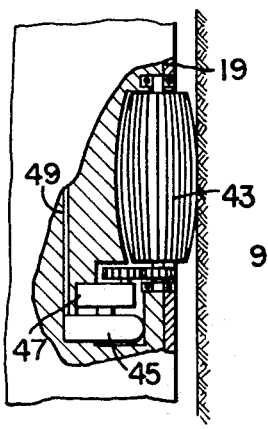
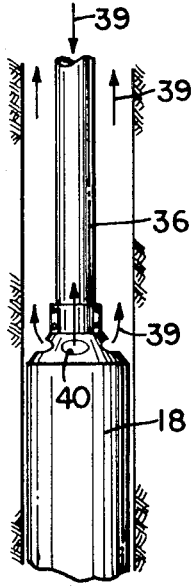
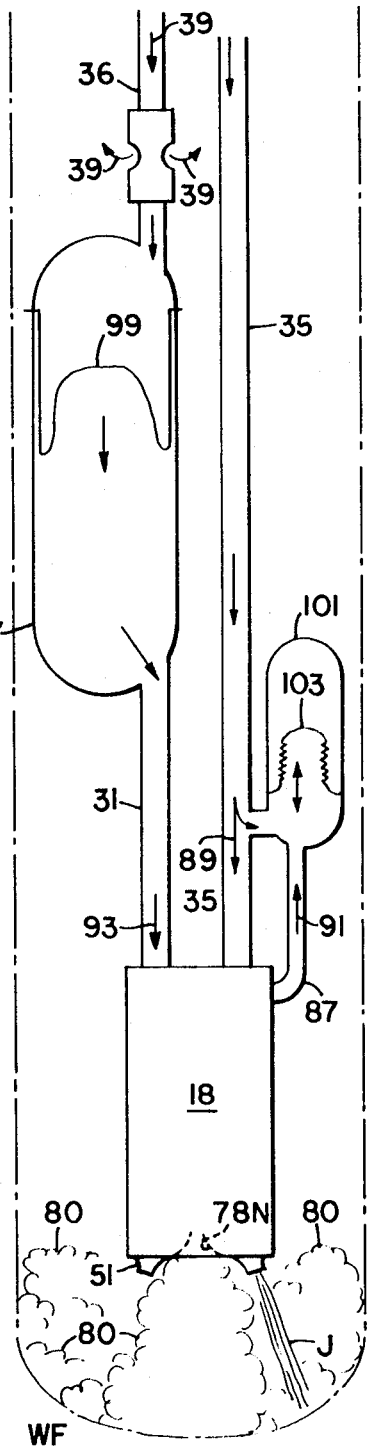
FIG_1  FIG_3  FIG_4  FIG_2
INVENTORS
LESTER C. ELMORE
THOMAS M. BROXHOLM
BY Fryer, Tjensvold, Feix, Phillips & Tempio
ATTORNEYS

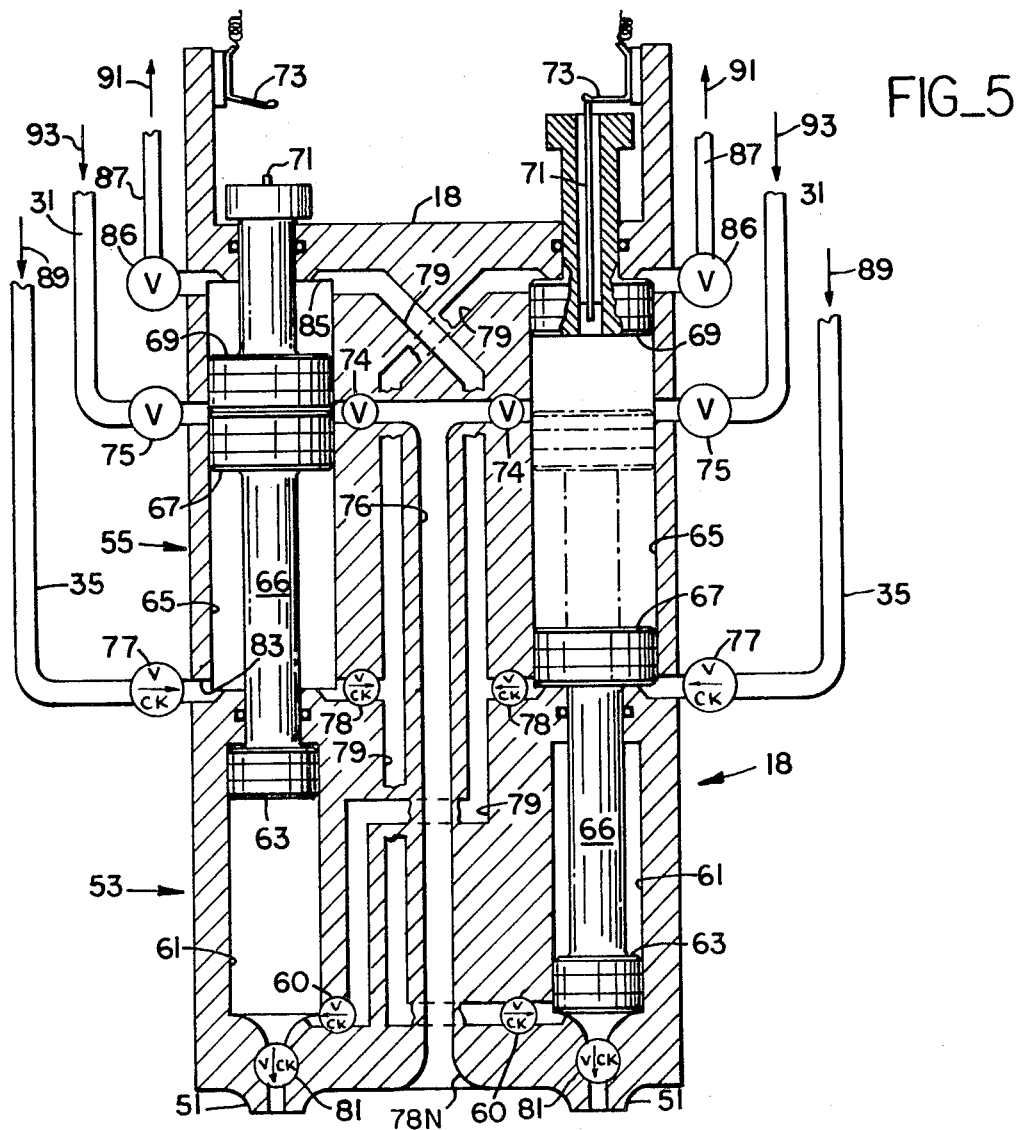
FIG_5

PULSED HIGH-PRESSURE LIQUID PROPELLANT COMBUSTION-POWERED LIQUID JET DRILLS

The present invention relates to pulsed combustion of a liquid propellant.

The present invention relates particularly to methods and apparatus for combining the pulsed combustion of the liquid propellant with a liquid jet drill for erosion drilling.

A liquid propellant is a liquid which can be changed into a large volume of hot gases at a rate which is suitable for propelling projectiles or air vehicles.

A liquid propellant will ignite in the bulk mode. For example, the liquid propellant may be ignited by an electrical spark device immersed in the liquid propellant without the need to vaporize the propellant prior to the ignition.

Liquid propellants are high energy density liquids.

A liquid propellant can be burned in discrete pulses to produce high combustion pressures. Pulsed burning of a liquid propellant can produce combustion pressures in the range of 10,000 to 80,000 pounds per square inch and even higher. The magnitude of the average combustion pressure in such pulsed burning can be controlled by the amount of the expansion permitted. Higher average combustion pressures can be produced by permitting less expansion.

Burning a liquid propellant in discrete pulses produces other results not obtainable by other means.

High-pressure combustion permits high-pressure exhaust, a fundamental requirement in operations characterized by high back pressure, such as deep ocean or deep oil well drilling operations.

Pulsed combination of a bulk-loaded liquid propellant permits ready metering of the charge and regulation of the output.

The pulsed combustion minimizes pumping losses, which can be prohibitive in continuous combustion at high pressure.

The high energy density of the liquid propellant and the high-pressure operation which can be produced by pulsed combustion results in very high horsepower outputs even under conditions of high back pressure operation. As a result, the pulsed combustion of a liquid propellant can be used to power high energy density machines which are small and lightweight.

It is a primary object of the present invention to combine the technology of pulsed high-pressure liquid propellant combustion, as described, with the technology of liquid jet erosion drilling in a way that will make the maximum use of the benefits of both technologies.

In liquid jet erosion drilling, pulsed jets of liquid, usually water, are directed against the work face to be drilled under very high pressure and at very high velocities. The high-velocity, high-pressure liquid jet has been found effective to transfer drilling energy from the drill to the work face at very high rates and at high efficiencies as compared to other methods of drilling.

Pulsed operation of the liquid jets has an additional advantage in that it permits more efficient breakup of the work face than continuous application of a liquid jet.

In accordance with the present invention a drill head has an internal combustion chamber which includes a piston mechanically linked to another piston of a liquid jet motor also contained within the drill head. A liquid propellant is fed into the combustion chamber in individual charges and is burned in the combustion chamber in discrete pulses. Individual charges of a liquid are concurrently fed into the liquid jet motor chamber and these charges are ejected through a nozzle associated with the motor chamber in pulses coincident with the burnings of the liquid propellant charges in the combustion chamber. The high horsepowers produced at the high combustion pressures during the pulsed combustion of the liquid propellant ejects the liquid through the nozzle in pulsed jets at high speed and high pressure. The high energy density power source permitted by the pulsed combustion of the liquid propellant permits the power source for the liquid jet erosion drill to be located right in the drill head. The pulsed combustion mode of operation also permits all of the working structure to be compactly arranged in the drill head. A liquid jet drill head constructed to incorporate the features described and effective to function in the manner described constitutes a specific object of the present invention.

Other and further objects of the present invention will be apparent from the following description and claims and are illustrated in the accompanying drawings, which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view, partly in cross section, of a drill constructed in accordance with one embodiment of the present invention;

FIG. 2 is a fragmentary view showing how a rigid drill pipe suspension can be used in place of the flexible cable suspension of FIG. 1;

FIG. 3 is a diagrammatic elevation view of a drill constructed in accordance with another embodiment of the present invention and illustrates how a propellant supply tank can be pressurized by the pressure head of the mud supply;

FIG. 4 is a fragmentary enlarged view in elevation illustrating structure for rotating the drill head of FIG. 1;

FIG. 5 is an elevation view in cross section of the drill head of FIG. 3.

A drill construction in accordance with one embodiment of the present invention is indicated generally by the reference numeral 11 in FIG. 1.

The drill 11 includes a drill head which is suspended from flexible cables 13 and 15 in the embodiment shown in FIG. 1.

The drill head is a two-part drill head and includes an upper part 17 and a lower part 19. The upper and lower parts are connected through a gimbal mount 21 to permit articulation of the lower part with respect to the upper part. The articulated connection permits the lower part 19 to be swung at an angle to permit directional or even horizontal drilling.

The upper part 17 has flutes 23, and the lower part 19 has flutes 24 spaced circumferentially to permit upward movement of debris through the mud circulation system.

The upper part 17 includes a power-driven track arrangement 27 which is engageable with the sidewall of the well to absorb the back thrust of the liquid jet erosion drills of the lower part 19 (as described in greater detail below). The track 27 is driven by a motor 29. The motor 29 may be powered by the burning of a liquid propellant through a line 31 or may be powered by electric motor or other suitable means.

In the embodiment of the invention as shown in FIG. 1 a second liquid propellant may be supplied through a line 33.

Water for the liquid jet (to be described in detail below) is supplied through a line 35, and the mud for the mud circulation system is supplied through a line 37. The water can also be supplied from a storage tank located in or close to the drill head rather than being supplied from the surface as shown in FIG. 1.

In the embodiment of the invention shown in FIG. 1, the outlet of the mud supply line 37 is disposed just slightly above the upper end of the upper part 17 of the drill head and the mud circulation is along the lines and in the direction indicated by the arrows 39. As will be described in greater detail below, the exhaust gases from the combustion of the liquid propellants supplied through the lines 31 and 33 is utilized to carry the debris up the flutes 24 and 23 and into the stream of circulating mud indicated by the arrows 39.

The lower part 19 is mounted for oscillation through 360° (as indicated by the arrows 41 in FIG. 1) about the longitudinal axis of the part 19, and a wall gripper and drive arrangement for accomplishing such oscillation is shown in detail in FIG. 4. The wall gripper includes a power-driven knurled roller 43. The knurled roller 43 is rotated by a motor 45 through gearing 47. The motor 45 may be turbine driven through the gas produced by combustion of a propellant and supplied to the turbine through passageway 49, or the motor 45 may be an electrical motor or other suitable drive means. The motor 45 is rotatable in opposite directions to provide continuous oscillation back and forth of the lower part 19 of the drill head during the time that the liquid jet erosion drill is in operation.

In accordance with the present invention, the lower part 19 of the drill head includes a plurality of liquid jet nozzles 51. The nozzles 51 direct a very high-velocity and very high-pressure jet of liquid (in this case water) against the work face WF at the bottom of the hole. The jets J are directed against the work face in discrete pulses from each individual nozzle, and the oscillation of the drill head 19 back and forth in the directions indicated by the arrows 41 produces substantially even drilling across the work face WF.

The liquid jets are ejected from the nozzles 51 by a plurality of fluid motors 53. The structure and mode of operation of a fluid motor 53 will be described in greater detail below with specific reference to FIGS. 3 and 5, but at this point it may be noted that the fluid motors are in the form of a cylinder and piston arrangement so that a fluid motor, in association with a nozzle 51, forms what is known as a water cannon for producing the extremely high-speed and high-pressure pulsed liquid jet J.

The lower part 19 of the drill head also includes a plurality of motors 55. The motors 55 each have a cylinder and piston arrangement providing a combustion chamber for pulsed combustion of a liquid propellant supplied through the line 31 (in a manner described in greater detail with reference to FIG. 5 below). A piston of a motor 55 is directly connected to a piston of a liquid jet motor 53 (as will also be described in greater detail below with reference to FIG. 5).

FIG. 2 shows another embodiment of the present invention in which a one-piece drill head 18 is directly connected to a rigid drillpipe 36. In this embodiment of the invention the mud circulating flow is in the direction and along the lines indicated by the arrows 39, passing through a series of openings 40 formed in the upper part of the drill head 18.

FIG. 5 illustrates how compactly the water cannons 53 and pulsed liquid propellant power drive motors 55 can be arranged in the drill head 18 of the FIG. 2 drill or in the drill head 19 of the FIG. 1 drill.

As shown in FIG. 5 each water cannon 53 comprises a cylindrical bore 61, which forms a working chamber for the liquid ejected through the nozzle 51, and a piston 63.

Each of the pulsed liquid propellant powered motors 55 includes a cylindrical bore 65 and a piston 67.

The pistons 63 and 67 are interconnected by a piston rod 66.

A piston 69 is also mounted in each of the bores 65. The piston 69 forms part of an ignitor mechanism for the liquid propellant. The ignitor mechanism is an electrical ignitor in this case, but other specific forms of ignitors, as described below, may also be used. When the piston is moved to the position shown at the upper right-hand corner of FIG. 5, a center electrode 71 engages an outer electrode 73 to produce an electrical spark within the liquid propellant in the combustion chamber between the pistons 67 and 69.

Liquid propellant is conducted into the chamber 65 through a conduit line 31 and through an inlet valve 75.

An internal passageway 76, including an exhaust valve 74, connects the outlet of the combustion chambers of the power motors 55 with an exhaust nozzle 78N formed in the bottom of the head block 18. This exhaust nozzle directs high-pressure exhaust gases against the work face WF to produce a gas pad (generally indicated by the reference numeral 80 in FIG. 3) which facilitates the liquid jet action by clearing debris and preventing the accumulation of a layer of liquid between the liquid jet nozzles 51 and the work face WF.

Liquid, usually water, is conducted to the chamber 61 through inlet conduit lines 35 and inlet valves 77 and 78. Passageways 79 formed internally in the head block 18 lead from the outlet of valves 78 to the bores, or working chambers, 61 of the water cannons 53.

Valves 81 are located in the throat of the nozzles 51 and are closed except during downward movement of the pistons 63.

A passageway 83 in the head block 18, and extending between the valves 77 and 78, includes openings as illustrated extending into the bore 65 on the underside of the pistons 67. This arrangement permits the incoming liquid used for the liquid jet to assist in cooling the power motor 55.

The upper portions of passageways 79 include openings 85 connecting the passageways with the upper ends of the bores 65 above the pistons 69.

Liquid return conduit lines 87 also open into the upper ends of the cylinders 65. Valves 86 are located in the conduit lines 87.

Valves 77, 78, 60, and 81 are one-way check valves as illustrated in FIG. 5. All of the other valves shown in FIG. 5 can be electrically actuated by conventional electrical solenoids (not shown), and the sequence of operation of these valves will be specifically described below in the description of operation.

The direction of incoming liquid is as indicated by the arrows 89, and the direction of outgoing liquid is as indicated by the arrows 91.

The direction of incoming liquid propellant is as indicated by the arrows 93.

It is a feature of the present invention that that pulsed operation of the power motors 55 minimizes, and in some cases entirely eliminates, the need for pumps to feed the propellant to the combustion chambers of the motors 55. The pulsed operation permits working with the pressure ambient to the drill head 18, rather than against this ambient back pressure and combustion chamber pressure as would be required in the case of continuous combustion. This feature of the invention will be described in greater detail below.

Before going into a description of the operation of the drill head shown in FIG. 5 and a description of the manner in which this feature of the invention is obtained, a quick reference to FIG. 3 should be made. As illustrated in FIG. 3 a liquid propellant storage tank 97 may be located close to the drill head 18.

The back pressure at the drill head can become quite large as the drilling depth increases. A rough indication of the back pressure can be obtained by dividing the depth in feet in half and expressing the resulting figure as pressure in pounds per square inch. Thus, drilling at an extreme depth such as 50,000 feet would produce ambient pressures around the drill head 18 in the order of magnitude of 25,000 pounds per square inch. That is, the column height of the circulating mud would produce back pressures in this order of magnitude (or greater depending on the specific gravity of the mud used) at this depth.

The storage tank 97 has a flexible diaphragm 99 separating the propellant in the bottom part of the tank from the mud above the diaphragm.

There is a difference in pressure head between the mud supply and the liquid supplied through the line 35 when the liquid is water. This difference in pressure head is due to the difference in the specific gravity of the mud and water. The mud is heavier, providing a higher pressure and establishing the ambient pressure level.

As also illustrated in FIG. 3 a liquid supply surge tank 101' may also be located adjacent the drill head 18 and connected to the excess liquid return line 87 as illustrated. The surge tank includes a flexible diaphragm or bladder 103 to separate a compressible gas in the upper part of the tank to thereby dampen surges from the excess water circulating through the line 87.

In the operation of the drill head 18 shown in FIG. 5, the pressure of the incoming propellant admitted through the valve 75 forces the pistons 69 from the position shown on the left-hand side of FIG. 5 upwardly to fill the working chamber of the bore 65 above the piston 67 with liquid propellant. The valve 75 is closed, the electrode 71 comes in contact with the electrode 73, and the resulting electric spark ignites the liquid propellant in the bulk mode.

This ability to ignite the liquid propellant in the bulk mode (i.e. the ability to ignite a container of liquid as opposed to requiring some degree of prior vaporizing or breaking up of the fuel into separate streams prior to the ignition as would be required with other fuels or with some mode of operation other than pulsed firing) is a considerable advantage in this drilling application. It greatly simplifies the structure and operational techniques.

While electrical ignition is illustrated in FIG. 5, the liquid propellant can also be ignited by other means, such as chemical, pyrotechnic techniques or compression ignition means. In all cases the propellant can be ignited in the bulk mode.

One example of a suitable chemical ignitor is a liquid oxidizer injected into a monopropellant. Another example of a chemical ignitor is solid oxidizer pellets injected into the liquid propellant in the combustion chamber.

An example of a compression ignition means is ethyl-propyl nitrate. This can be ignited in the vapor phase by compression to produce a flame which can be injected directly into the liquid propellant.

Continuing with the description of the operation of the structure shown in FIG. 5, the ignition of the liquid propellant produces high-pressure combustion above the piston 67. This combustion pressure can range from 10,000 to 80,000 pounds per square inch and even higher. The combustion pressure can be regulated by varying the size of the charge of the liquid propellant admitted through the inlet valve 75. It is more efficient to expand out as far as possible. However if a higher exhaust pressure is needed, the liquid propellant can be burned at a higher pressure or the expansion ratio can be changed.

Combustion of the liquid propellant within the enclosed space between the pistons 69, 67 and inlet valve 75 and outlet valve 74 produces a sharp pulse of power driving the piston 67 down to the position illustrated at the right-hand side of FIG. 5.

This, in turn, forces the liquid out of the working chamber 61 through the valve 81 and out the nozzle 51 at very high speed and under very high pressure. At this time the one-way check valves 60 are closed. Liquid jet velocities of 5,000 to 10,000 feet per second in the jet J and liquid pressures of 100,000 pounds per square inch in the chamber 61 are readily produced by the water cannon or motor 53.

The piston 67 may preferably be made larger in area than the piston 63 so that the combustion chamber pressure is multiplied by the amount of the differential area to produce a higher static pressure in the working chamber 61 of the liquid jet motor 53.

The exhaust valve 74 is opened near the end of the downward stroke of the piston 67, and the exhaust gases then flow out of the nozzle 78N to produce the high-pressure gas pad 80 described above and shown in FIG. 3. This exhaust pressure is higher than the pressure head of the circulating mud so that the exhaust gases clear the work face WF and carry debris upward to the circulating mud flow indicated by the arrows 39.

As the left-hand piston 67 is driven to the downward position (illustrated at the right-hand side of FIG. 5), the water transfer valve 78 of the left-hand motor is opened. The liquid in the bore 65 beneath the piston 67 flows through the check valve 78, the passageway 79 and the check valve 60 to the underside of the right-hand piston 63 to return the right-hand pistons 67 and 63 to the upper position (as shown in the phantom outline). As the right-hand pistons 67 and 63 are moved upward by the liquid flowing into the bore 61 beneath the piston 63, the check valve 77 opens to permit flow of liquid into the bore 65 beneath the piston 67. The right-hand piston 69 is also returned (to the downward position shown at the left-hand side of FIG. 5) by the flow of liquid to the upper part of passageway 79 and the resulting liquid pressure exerted on the upper end of the piston 69. The valve 86 in the excess liquid return line 87 is opened near the end of the upward stroke of the piston 63 and the end of the downward stroke of the piston 69 to permit circulation of excess liquid back to the accumulator or surge tank 101 and to the incoming water supply line 35. The exhaust valve 74 is closed, and the right-hand motors 53 and 55 are ready for another cycle of operation.

The pistons 67 shown at the right- and left-hand sides of FIG. 5 are thus fired in pulses in alternation to produce corresponding pulsed liquid jets through the nozzles 51 and corresponding pulsed jets of gas out of the nozzle 78 between each pulsed liquid jet.

A liquid monopropellant may be used with the structure shown in FIG. 5 or a bipropellant or a tripropellant may be used. The use of a monopropellant simplifies the conduits and valving required to transmit the incoming liquid propellant to the working chamber of the motor 55.

The propellant may be supplied from a storage tank located near the drill head 18 as shown in FIG. 3, or the propellant may be supplied through propellant supply lines extending to the surface, such as the lines 31 and 33 shown in FIG. 1.

Examples of liquid propellants that are suitable for the drill described above are as follows:

1. Mixtures of hydrazine, hydrazine nitrate and water
2. Ethyl-propyl nitrate
3. Nitric acid in combination with jet fuel, diesel fuel or gasoline.

The pulsed operation permits the incoming liquid propellant to be delivered to the combustion chamber at a time when there is no combustion occurring in the combustion chamber. The incoming propellant can therefore be supplied under much less pressure than would be the case if the propellant has to be pumped into the combustion chamber against a pressure head of a continuing combustion process. Since the combustion pressure must always be higher than the ambient pressure, the pulsed operation of the present invention has a very substantial benefit in eliminating the need for a pump to overcome the combustion chamber pressure, as would be required in a continuous combustion process.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A drill comprising, a drill head, nozzle means on the drill head for directing a jet of liquid against the surface to be drilled, motor means within the drill head for ejecting pulsed high-velocity and high-pressure jets of liquid through the nozzle means, a source of liquid, conduit means for conducting the liquid from the source to the motor means, power means for producing bulk-burned pulsed high-pressure liquid propellant combustion in a combustion chamber within said drill head, a source of liquid propellant, conduit means for conducting the liquid propellant to the power means and power transfer means for transferring the power produced by said combustion to the liquid in the motor means to eject the liquid through the nozzle means.

2. A drill as defined in claim 1 wherein the liquid propellant produces high combustion pressures and large power outputs.

3. A drill as defined in claim 2 wherein the propellant is a high energy density liquid propellant which produces combustion pressures in the range of 10,000 to 100,000 pounds per square inch.

4. A drill as defined in claim 2 wherein the propellant is of the kind that can be ignited in the bulk mode.

5. A drill as defined in claim 2 wherein the liquid propellant is a monopropellant.

6. A drill as defined in claim 2 wherein the liquid propellant includes a nonhypergolic bipropellant.

7. A drill as defined in claim 1 wherein said power means include an exhaust nozzle in fluid communication with the combustion chamber and located on the underside of the drill head and effective to produce a high-pressure gas pad from the exhaust of each pulsed combustion to facilitate the liquid jet action and to implement debris scavenging and transfer from the work face to a mud circulation system associated with the drill.

8. A drill as defined in claim 1 including circulation means within the drill head for circulating the liquid used for the jet in close proximity to the combustion chamber to provide cooling for the combustion chamber prior to ejecting the liquid through the nozzle means.

9. A drill as defined in claim 1 including electrical means for producing an electrical spark to ignite the propellant.

10. A drill as defined in claim 1 wherein the drill includes a plurality of nozzle means, motor means and power means in a single drill head.

11. A drill as defined in claim 1 wherein the power transfer means include a piston providing a mechanical link between the combustion chamber and the motor means.

12. A drill as defined in claim 1 including mud circulating means for circulating a drilling mud around the drill, a storage tank adjacent to the drill head for storing the liquid propellant fuel, and pressurizing means interconnecting the mud-circulating means and the interior of the storage tank and effective to pressurize the liquid propellant with the pressure head of the mud to eliminate the need for a pump to supply propellant to the combustion chamber.

13. A drill as defined in claim 1 including a cable suspension for the drill and articulation means associated with the drill head to permit directional drilling and horizontal drilling.

14. A drill as defined in claim 1 including track means associated with the drill head and engageable with the sidewalls of the well to absorb the thrust of the pulsed jet through the nozzle means.

15. A drill comprising, a drill head block, a liquid jet nozzle at one end of the block, a first cylinder and piston within the block and connected to the nozzle to eject a high-speed and high-pressure jet of liquid through the nozzle on actuation of the piston in one direction within the cylinder, a source of liquid, first conduit means for conducting the liquid to the first cylinder, a second cylinder and piston within the block, a mechanical link between the second and first pistons for transferring force from the second piston to the first piston, a source of high energy density liquid propellant, second conduit means for conducting the liquid propellant into the second cylinder, and ignition means for igniting the liquid propellant in the second cylinder in the liquid phase and causing bulk burning at high pressure to provide the high power required to produce effective liquid jet drilling in the high back pressures existing at deep depths of the well, valve means in the second conduit means for controlling the flow of the liquid propellant to the second cylinder in individual quantities, and ignition control means for producing pulsed burning of the propellant in sequence with the supply of individual quantities of said propellant.

16. A drill as defined in claim 15 including a gas exhaust port for the burned propellant located in one end of the block and adjacent the liquid jet nozzle to provide a gas pad which facilitates the liquid jet action by clearing debris and preventing the accumulation of a layer of liquid between the nozzles and the work face of the well.

17. A drill as defined in claim 15 wherein the ignition control means include a third piston in the second cylinder and movable in response to inflowing propellant to a position establishing an electrical connection for an electrical spark.

18. A drill as defined in claim 15 wherein the drill includes a plurality of said first and second cylinders and pistons and interconnections between the cylinders providing for sequential pulsed operation of the interlinked first and second piston combinations.

19. A method of drilling by periodically ejecting a high-pressure, high-speed liquid jet through a nozzle against a drill face and comprising, positioning a drill head with a nozzle opposite a drill face, periodically loading a quantity of liquid into a working chamber of a motor within the drill head behind the nozzle, periodically loading a quantity of high energy density liquid propellant into a combustion chamber within the drill head, igniting the liquid propellant in the bulk mode in the combustion chamber after each quantity of propellant has been loaded to produce bulk burnings of the liquid propellant in high-pressure pulses, and transferring the power from the high-pressure pulses in the combustion chamber to the working chamber of the motor to eject the liquid through the nozzle to produce pulsed high-speed and high-pressure liquid jets effective to drill through the drill face opposite the drill head.

20. A method as defined in claim 19 including exhausting the combustion products near the liquid jet nozzle to produce a high-pressure gas pad between the liquid jet nozzle and the drill face.

21. A method as defined in claim 19 wherein the liquid propellant produces combustion pressures in the range of 10,000 to 100,000 pounds per square inch.

* * * * *